United States Patent [19]
Pau

[11] Patent Number: 5,923,375
[45] Date of Patent: Jul. 13, 1999

[54] MEMORY REDUCTION IN THE MPEG-2 MAIN PROFILE MAIN LEVEL DECODER

[75] Inventor: Danilo Pau, Sesto S. Giovanni, Italy

[73] Assignee: SGS-Thomson Microelectronics S.r.l., Agrate Brianza, Italy

[21] Appl. No.: 08/799,143

[22] Filed: Feb. 13, 1997

[30] Foreign Application Priority Data

Feb. 27, 1996 [EP] European Pat. Off. .............. 96830085

[51] Int. Cl.$^6$ ....................................................... H04N 7/32
[52] U.S. Cl. ........................... 348/390; 348/384; 348/413; 348/416
[58] Field of Search ..................................... 348/384, 390, 348/394, 395, 400–407, 409–416, 699; 345/502, 506; 382/234, 232

[56] References Cited

U.S. PATENT DOCUMENTS

| | | | |
|---|---|---|---|
| 5,212,742 | 5/1993 | Normile et al. | 382/234 |
| 5,557,538 | 9/1996 | Retter et al. | 348/402 |
| 5,576,765 | 11/1996 | Cheney et al. | 348/407 |
| 5,579,052 | 11/1996 | Artieri | 348/416 |
| 5,581,302 | 12/1996 | Ran et al. | 348/416 |
| 5,589,885 | 12/1996 | Ooi | 348/416 |
| 5,598,483 | 1/1997 | Purcell et al. | 382/232 |
| 5,623,311 | 4/1997 | Phillips et al. | 348/384 |
| 5,638,531 | 6/1997 | Crump et al. | 345/502 |
| 5,684,534 | 11/1997 | Harney et al. | 348/390 |
| 5,699,117 | 12/1997 | Uramoto et al. | 348/390 |
| 5,701,160 | 12/1997 | Kimura et al. | 348/413 |
| 5,774,206 | 6/1998 | Wasserman et al. | 348/416 |
| 5,818,533 | 10/1998 | Auld et al. | 348/390 |
| 5,838,597 | 11/1998 | Pau et al. | 364/715.02 |
| 5,844,608 | 12/1998 | Yu et al. | 348/390 |

FOREIGN PATENT DOCUMENTS

| | | | |
|---|---|---|---|
| 0 577 418 A2 | 6/1993 | European Pat. Off. | H04N 7/32 |
| 0 673 171 A2 | 3/1995 | European Pat. Off. | H04N 7/50 |
| 0 682 454 A2 | 5/1995 | European Pat. Off. | H04N 7/26 |
| 0 697 794 A2 | 7/1995 | European Pat. Off. | H04N 7/50 |
| 44 08 552 A1 | 3/1994 | Germany | H04N 7/03 |

OTHER PUBLICATIONS

Leonard Chiariglione, "Short MPEG–2 Description," International Organization for Standardization, Jul. 1996, pp. 1–5.

SGS–Thomson Microelectronics, MPEG–2/CCIR 601 Video Decoder (STI3500A), Jul. 1994.

Primary Examiner—Tommy P. Chin
Assistant Examiner—Vu Le
Attorney, Agent, or Firm—Allen, Dyer, Doppelt, Milbrath & Gilchrist, P.A.

[57] ABSTRACT

The video memory requisite of an MPEG-2 decoder commonly comprising a stage of decompression of the respective I, P and B-pictures of the MPEG compression algorithm before writing the data in respective buffers organized in the video memory and in which the decompression of a B-picture implies the use of forward and backward motion compensation predictors is reduced without losing image quality. This is achieved by: decompressing by macroblocks a B-picture while maintaining the relative backward predictor, stored in the memory, in a compressed form and decompressing macroblocks of a compressed P-picture using the respective forward predictor values; defining through the decompressed P-macroblocks the region of the stored compressed backward predictor containing the backward predictor value of the macroblock of the B-picture undergoing decompression; and extracting from the region the respective backward predictor value for the B-macroblock undergoing decompression, and completing the motion compensation routine according to the MPEG standard.

2 Claims, 12 Drawing Sheets

MEMORY REDUCTION IN THE MPEG-2 MAIN PROFILE MAIN LEVEL DECODER

FIELD OF THE INVENTION

The present invention relates to an integrated video decoder based on the use of the MPEG compression algorithm, and, more particularly, according to a second and more advanced version of the MPEG standard called MPEG-2, having a reduced requisite of video memory.

BACKGROUND OF THE INVENTION

The MPEG-1 standard was developed in response to the industry need of implementing an efficient way of storing and retrieving video information on storage media of the digital type, as, for example, CD-ROMs. Of course, the MPEG-1 standard is also a powerful tool for efficiently storing data on storage media, such as DATs, Winchester disks, optical disks and ISDN and LAN networks. A more efficient version of the standard, called MPEG-2 has been developed in support of bitrate requisites in the field of digital video transmission applications. The standard has been generally accepted for digital TV systems, for compressing TV-resolution pictures, entirely interlaced, up to a bitrate of about 20 Mbps. A special version of the MPEG-2 standard is expected to be used in future generation HDTV systems.

The MPEG standard incorporates and utilizes important algorithms and criteria defined by previous international standards, such as, for example, the CCITT motion vectors determination algorithm H.261 and the ISO 10918 standard of the ISO JPEG Committee for the coding of still pictures. A definition of the MPEG standard (1 and 2), as well as an exhaustive description of the different techniques of implementation and the relative coding and decoding systems of the data pertaining to compressed video pictures according to the MPEG standards are described in a wealth of articles and publications on the subject, among which the following can be mentioned:

Draft International ISO/IEC DIS 13818-2 "Information technology—Generic coding of moving pictures and associated audio information".

"MPEG coding and transport system" by Leonardo Chiariglione, Digital Television Broadcasting—Proceedings.

"The MPEG video compression algorithm" by Didier J. Le Gall, Signal Processing Image Communication, Elsevier Science Publishers B.V., Vol. 4, No. 2, April 1992.

Digest No. 1995/012, Electronics Division, Institution of Electrical Engineers—London, Colloquium on: "MPEG-2—what it is and what it isn'2".

"An Overview of the MPEG Compression Algorithm" Technical Note released by SGS-THOMSON MICROELECTRONICS (An 529/0294).

Datasheet "STi3500A" Datasheet of SGS-THOMSON MICROELECTRONICS.

"STi3520A—Advanced Information for an MPEG Audio/MPEG-2 Video Integrated Decoder" (June 1995).

Figure 1:
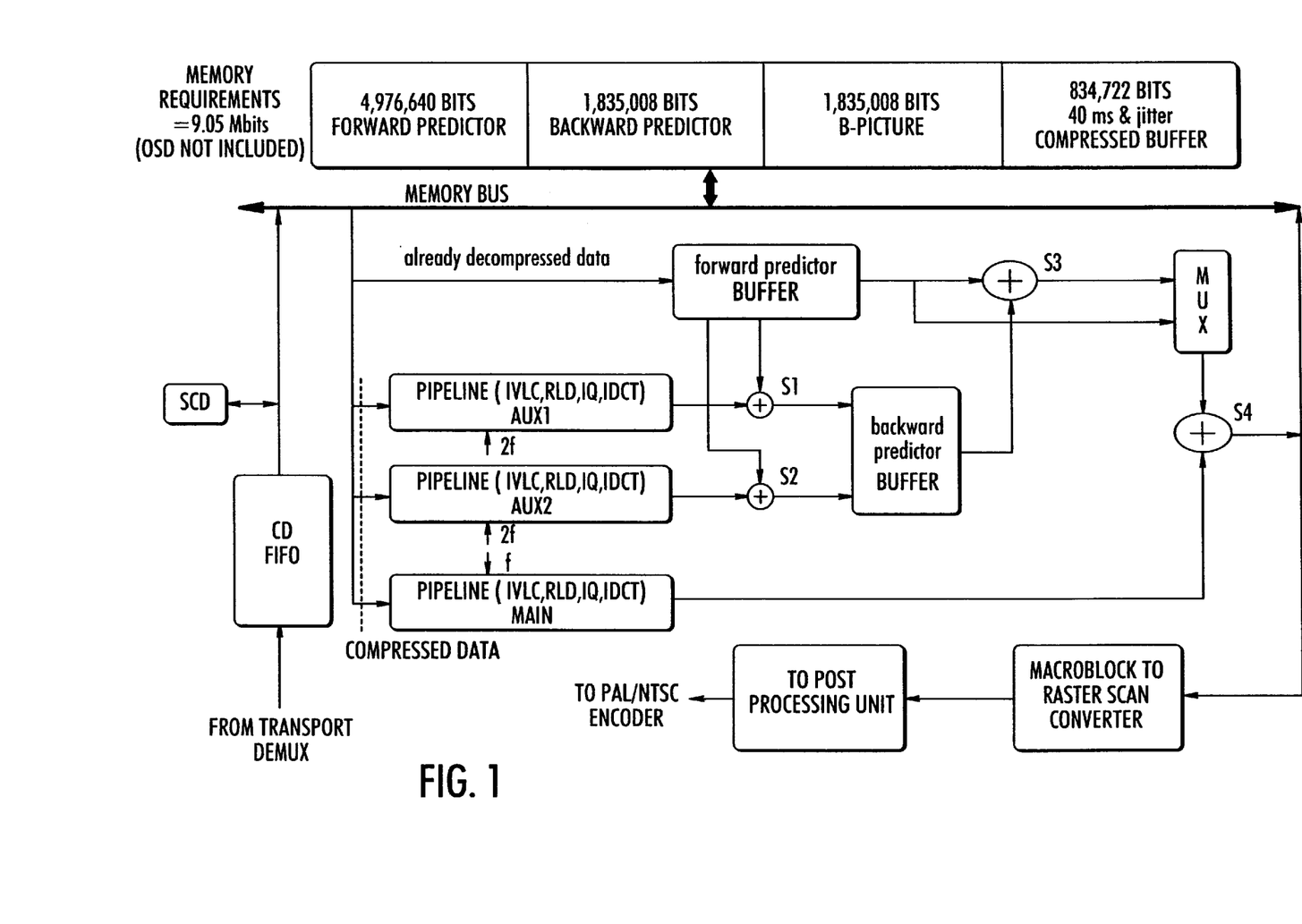
FIG. 1 is a block diagram showing the "core" of a video decoder realized according to the present invention.

According to a typical architecture of an MPEG-2 decoder, such as that shown in FIG. 3 of the publication No. STi3520A relative to an MPEG Audio/MPEG-2 Video integrated decoder marketed by SGS-THOMSON MICROELECTRONICS, herein reproduced as FIG. 1, there exist well defined requisites of video memory. The capacity of an external DRAM memory that, for a PAL and NTSC application, capable of supporting 16 Mbits PAL video signals, can be estimated as follows. Considering that both the MPEG-2 video decoder and the MPEG audio decoder access a unique external DRAM memory of 16Mbits, through a common interface. The audio decoder may require access to only 131.072 bits leaving the remaining 16.646.144 bits available for satisfying the requisites of the MPEG-2 video decoder. The video memory, according to a customary scheme, can be configured as follows.

A "Bit buffer", that is, a buffer for compressed data that the MPEG-2 standard fixes at 1.75Mbits plus an extra amount, for example of 834.722 bits, in consideration of a nonideal process of decompression being actually implemented.

A first "I-frame buffer" for the decompressed Intra-Picture or briefly I-picture, in a 4:2:0 format.

A second "P-frame buffer" for the decompressed Predicted-Picture or briefly P-picture, in a 4:2:0 format.

A third "B-frame buffer" for the decompressed Bidirectionally Predicted Picture or briefly B-picture, in a 4:2:0 format, eventually optimized so to require a reduced amount of memory, that is of 0.7407 or 0.6111 of a frame respectively in the case of a PAL or NTSC system.

According to the known MPEG-2 standard technique, and regardless of dealing with an I, P or B-picture, dependingly on the type of video standard, each "frame buffer" in the format 4:2:0 occupies an amount of memory given by the following table.

| PAL | 720 × 576 × 8 for the luma (luminance) (Y) | 3.317.760 bits | = 4.976.640 bits |
|---|---|---|---|
| | 360 × 288 × 8 for the U chroma (chrominance U) | 829.440 bits | |
| | 360 × 288 × 8 for the V chroma (chrominance V) | 829.440 bits | |
| NTSC | 720 × 480 × 8 for the luma (luminance) (Y) | 2.764.800 bits | = 4.147.200 bits |
| | 360 × 240 × 8 for the U chroma (chrominance U) | 691.200 bits | |
| | 360 × 240 × 8 for the V chroma (chrominance V) | 691.200 bits | |

Therefore, in the case of a PAL system, which representing the most burdensome case, may serve as a reference example, the actual total amount of memory required will be given by:

$$1.835.008+835.584+4.976.640+4.976.640+(4.976.640*0.7407)= 16.310.070 \text{ bits.}$$

This calculation takes into account a 0.7407 optimization of the B-picture frame buffer.

A further optimization may includes carrying out the decompression of the B-picture without resorting to a storage step in the external RAM by carrying out an equivalent function internally in the integrated decoder device by a dedicated circuit block functionally placed upstream of the Display Unit, and commonly referred to as MACROBLOCK TO RASTER SCAN CONVERTER. This is implemented by employing an internal buffer for the B-picture made of high speed integrated memories, such as, for example, synchronous SDRAMs functioning at 100 Mhz and beyond.

Considering this further optimization, the video memory requirement is further reduced to:

$$1.835.008+835.584+4.976.640+4.976.640=12.623.872 \text{ bits}$$

because the internal B-buffer permits to convert the scanning of each 8*8 (pel) block, as defined in the MPEG-2 compressed data stream, into a line scanning of the field or frame picture required by the displaying process of the image on a TV screen. The European Patent Application No. 95830504.7, filed on Dec. 4, 1995, in the name of the present assignee, describes a method and a relative MPEG-2 decoder architecture according to which, through a recompression step of the I and P pictures, after the MPEG-2 decompression, according to an adaptive differential pulse code modulation (ADPCM) scheme, the memory requisite is remarkably reduced, to less than 8 Mbit, with a relatively small degradation of the image quality.

SUMMARY OF THE INVENTION

With the same aim of reducing the memory requisite, in respect to that of known systems, a decoding method and a relative architecture have now been found that attain a remarkable reduction of the memory requisite while preserving the quality of the images. Thus, differently from the system described in the above-mentioned prior patent application, the system of the present invention preserves practically unaltered the conversion quality with a reduced or optimized memory requisite.

Basically, the method of the present invention avails itself the macroblock of a decompression by macroblocks of a B-picture, compressed and stored in the external RAM memory, using, in the worst case, the two forward and backward predictors. The forward predictor belongs to a picture that is stored in the external memory in decompressed form.

On the contrary, according to an essential aspect of the invention, the backward predictor is not immediately accessible (available in a decompressed form) in the external RAM memory like in known systems, rather are the P-macroblocks that define the area of the picture compressed and stored in the external RAM memory, where such backward predictor would be located, that are accessed.

On the other hand, these P-macroblocks are stored in a compressed form and therefore the method of the invention provides for their decompression using the relative forward predictors (for motion compensation), which are different in the worst case, from those used for decompressing the above-mentioned B-picture macroblock, and which anyway are always used for completing the motion compensation routine, according to the MPEG standard.

According to another aspect of the invention, this is made possible by a peculiar architecture of the "core" of the video decoder, characterized by the presence of two auxiliary decompression and decoding pipelines in addition to the decompression and decoding main pipeline proper of a basic decoder scheme and by making said two auxiliary pipelines to function at a clock frequency double than that of the main pipeline MPEG-2 data of decoding and decompression.

BRIEF DESCRIPTION OF THE DRAWINGS

The different aspects and relative advantages of the invention will become even more evident through the following description of an important embodiment and by referring to the attached drawings, wherein.

DETAILED DESCRIPTION OF PREFERRED EMBODIMENTS

The embodiment illustrated in FIG. 1 shows an MPEG-2 video decoder usable in PAL or NTSC applications, capable of supporting 16Mbits PAL video signals. The block diagram is simplified in a way of highlighting the "core" or "video core" of the chip containing the integrated circuit of the MPEG-2 video decoder. As shown, the system envisages the employment of an external DRAM memory, that is, contained in a distinct chip, whereto the "video core" of the decoder accesses through a memory bus, that can be shared also by an "audio core" of the MPEG decoder (as shown in the figure) for accessing a respective audio buffer, which can also be organized in the same external DRAM device.

Of course, the video "core" will be interfaced other than to the memory bus also to a control bus (not shown in the figure) through which a system control microprocessor intervenes through a dedicated interface, which is also not shown in the figure, but whose function and architecture can be immediately visualized by an expert of the art, eventually by referring to the wealth of literature about this topic, as for example the publications cited in the background of the invention.

By referring to FIG. 1, the "core" of the video decoder comprises a "first-in-first-out" block, CD FIFO, for the acquisition and writing of compressed data, relative to the I, P and B-pictures, in the respective buffers of the external video memory (DRAM). A start code detector circuit SCD detects the initial code of a picture in the video bit stream, providing a start signal for a correct synchronization of the decoding system by the microprocessor, through the relative control bus. The main block of decoding and decompression is represented as a whole by the block MAIN PIPELINE (IVLC, RLD, iQ, IDCT), functioning at a clock frequency f. The block FORWARD PREDICTOR BUFFER represents a buffer in which is written the decompressed forward predictor value pertaining to the current macroblock of the B-picture in case of decompression, read from the relative buffer (4,976,640 BITS) of the external RAM.

According to an important aspect of the invention, the backward predictor is maintained compressed in the respective buffer (1,835,008 bits) of the external RAM and the backward predictor specific value pertaining to the macroblock of the B-picture in phase of decompression is extracted and stored in a dedicated BACKWARD PREDICTOR BUFFER of the "core", using for such a purpose a dedicated network. This dedicated or auxiliary network is constituted besides by the FORWARD PREDICTOR BUFFER and the BACKWARD PREDICTOR BUFFER blocks, by a first and a second decoding and decompression pipelines, AUX1 PIPELINE (IVLC, RLD, iQ, IDTC) and AUX2 PIPELINE (IVLC, RLD, iQ, IDTC), respectively, both having the same architecture of the first or MAIN pipeline and functioning in parallel thereto, but with a double clock frequency 2 f and by two adders: S1 and S2.

In practice, as more extensively illustrated hereinbelow, by means of this additional or auxiliary network, the compressed macroblocks of the P-picture are accessed and decompressed by using the respective forward predictors that are available, in a decompressed form, from their respective buffer of the external video RAM memory. The decompressed P-macroblocks single out the video region, belonging to the picture that is stored in a compressed form in the RAM region denoted as Backward Predictor in the diagram of FIG. 1. In this region is stored the backward predictor value pertinent to the macroblock of the B-picture being decompressed, thus allowing extraction of the correct backward predictor value of the B-macroblock being decompressed and storage of it in the dedicated internal BACKWARD PREDICTOR BUFFER.

The third adder S3 serves to generate the motion compensation vectors that, selected through the multiplexer MUX, allow completion of the motion compensation procedure for the B-picture macroblock being decompressed through the fourth adder S4. The macroblocks of the B-picture, decompressed and compensated for the motion, are thereafter sent to the block MACROBLOCK TO RASTER SCAN CONVERTER that carries out the conversion from macroblock-scan to raster-scan of the image data before sending them to a post-processing unit that commonly precedes a PAL/NTSC coder for displaying the image on a TV screen.

The whole memory requirement that by neglecting the relatively small capacity requirements of an eventual on-screen display (OSD) function, amounts to 9.05 Mbits (=9,481,378 bits) is indicated in FIG. 1. This represents a saving of approximately 6.8 Mbits in respect to the optimized basic requisite of 16,310,070 bits of a standard MPEG-2 decoder. Indeed the MPEG-2 standard defines the maximum dimension of a compressed frame in 1,835,008 bits (1.75 Mbits).

Storing the P-picture and the B-picture in a compressed form requires an amount of memory equal to 1,835,008*2= 3,670,016 bits. According to the architecture of the present invention, an external (DRAM) memory may be organized, as indicated in the diagram of FIG. 1, in the following way.

A frame buffer for the forward predictor, which is originally an I-picture but that is gradually updated by the successive P-pictures decompressed and already displayed, whose size as fixed by the MPEG-2 standard is of 4,976,640 bits for the PAL system (most critical (largest) size) and 4,147,200 bits for the NTSC system.

A buffer for the P-picture, that is, for the backward predictor, capable of containing, for the worst case envisaged by the MPEG-2 standard, 1,835,008 bits.

A buffer for the B-picture containing, for the worst case envisaged by the MPEG-2 standard, 1,835,008 bits.

An extra buffer (40 ms & jitter compressed buffer) to make up for the nonideality of the process of decompression implemented in the chip and that may have a capacity of 834,722 bits.

According to the method of the invention implemented by the use of a decoder having an architecture as that shown in FIG. 1, the storage of data and the decompression of the compressed data written in the video RAM memory takes place, in the following manner. A first step consists of storing by means of a CD FIFO block, the bitstream coming from a data transfer demultiplexer in the respective buffers configured in the external DRAM.

A second step detects the start code (SCD) of a picture in the bitstream so as to single out which parameters contained in the bitstream can be used to instruct the "core" registers of the decoder, with the help of a system's microprocessor (not shown in the figure).

As soon as an I-picture is detected, this is decompressed and stored in the region of the external RAM referred to as Forward Predictor in the scheme of FIG. 1, but it is not yet sent to the post-processing circuitry (for its conversion from a 4:2:0 format to a 4:2:2 format and its subsequent display on the TV screen). At the same time, a compressed P-picture is stored in the Backward Predictor buffer of the external RAM without being subject to decompression.

Eventually a new compressed B-picture arrives in the bitstream and is stored in the relative buffer (B-picture) of the external RAM. At this point, it is possible to display the compressed I-picture and the time taken by this operation is, in the case of a PAL format, 40 ms.

Once the displaying of the I-picture is over, the B-picture is decompressed through the MAIN pipeline while using the auxiliary pipelines AUX1 and AUX2 for decompressing and defining the backward predictor. At the same time, the MACROBLOCK TO RASTER SCAN CONVERTER carries out the conversion in a raster format before the following display takes place. Finally, the P-picture previously stored in a compressed form in the relative buffer of the external DRAM is decompressed, and is simultaneously displayed and stored in the same buffer of the external RAM thus becoming the new (updated) forward predictor.

By referring to the functional scheme of the "core" of the decoder of the invention, the main decoding and decompressing pipeline (MAIN) that works at a clock frequency f, carries out the decompression of the I-pictures, of the B-pictures and of the P-pictures. The two auxiliary decoding and decompressing pipelines (AUX1 and AUX2), functioning at a double frequency 2 f, are utilized for decompressing the backward predictor values for permitting a correct reconstruction of the B-pictures.

Figure 2:
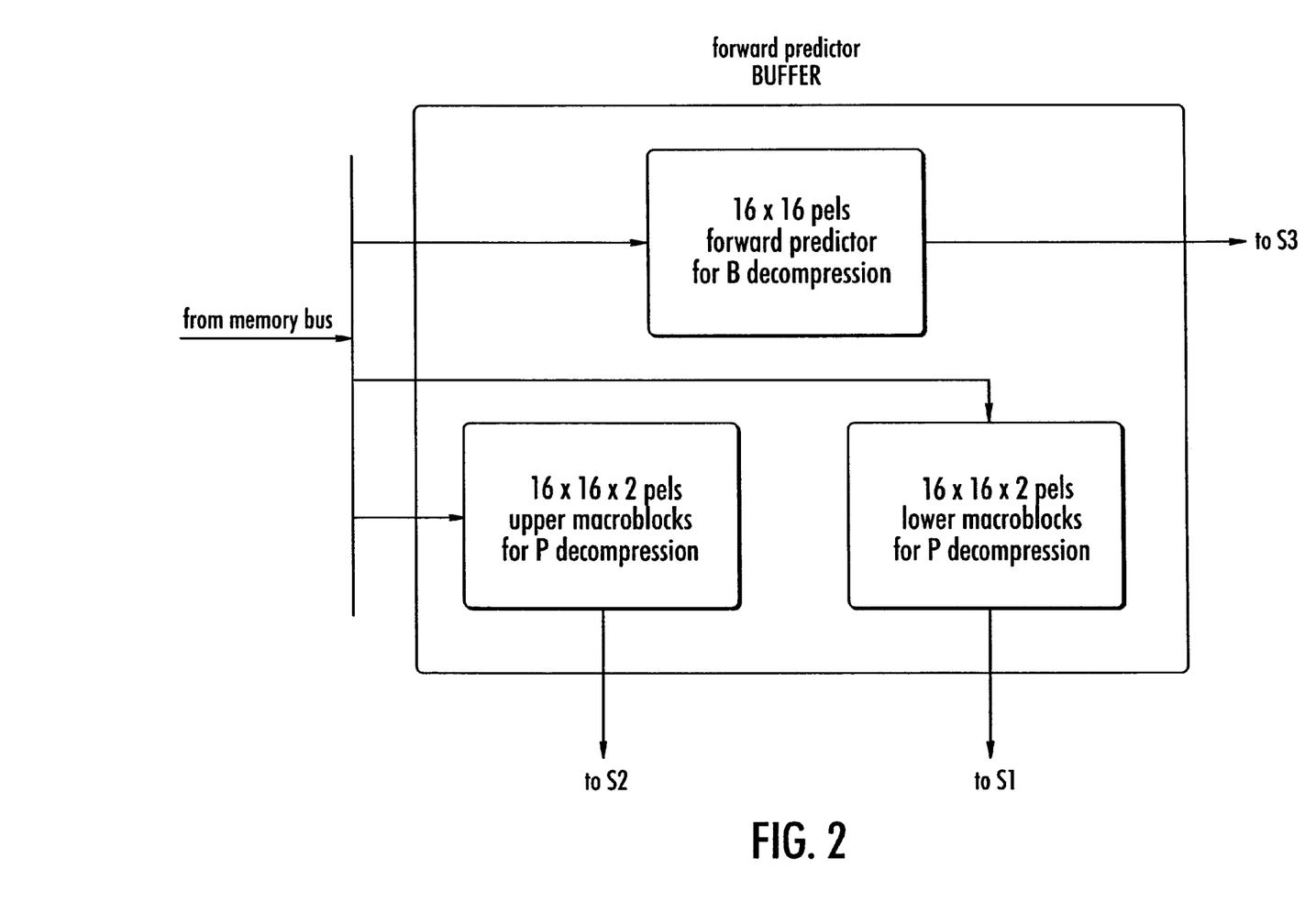
FIG. 2 shows the internal architecture of the FORWARD PREDICTOR BUFFER block of the "core" of the decoder of FIG. 1.

FIG. 2 shows the internal architecture of the circuit block FORWARD PREDICTOR BUFFER. As it may be observed, the circuit comprises a pair of registers (16*16*2 pels) that store the forward predictors, higher and lower, of the backward macroblocks (in phase of decompression through the auxiliary AUX1 and AUX2) that define the video area in which there exists the backward predictor of the B-macroblock being decompressed through the MAIN pipeline.

For example, it is supposed that a sequence of macroblocks is read from the B-picture buffer of the external RAM, and that the $i^{th}$ macroblock be subject to decompression in the MAIN pipeline. From this macroblock, in the I-VLC block of the MAIN pipeline, are derived two motion vectors (in the worst case) that point to the forward predictor and to backward predictor, respectively, according to the MPEG-2 standard. Such predictors relate to information existing in the external RAM and that must be loaded in the decoder "core".

The forward predictor is already decompressed and is read by the homonymous RAM buffer and placed in the 16*16 pel register, shown in the top portion of FIG. 2. Conversely, the backward predictor is not accessible because it is enclosed in a video zone, which, however, is identified by four macroblocks disposed around the backward motion vector that is associated with the B-macroblock, in the phase of decompression through the MAIN pipeline.

The 4 macroblocks are read from the RAM area referred to as "Backward Predictor" according to the scheme of FIG. 1. Two of them are sent to the AUX1 pipeline and the remaining two to the AUX2 pipeline. For this reason, each auxiliary pipeline must operate at a double speed (2 f) than that of the MAIN pipeline, which conversely performs at normal (system's clock) speed (f).

Figure 4:
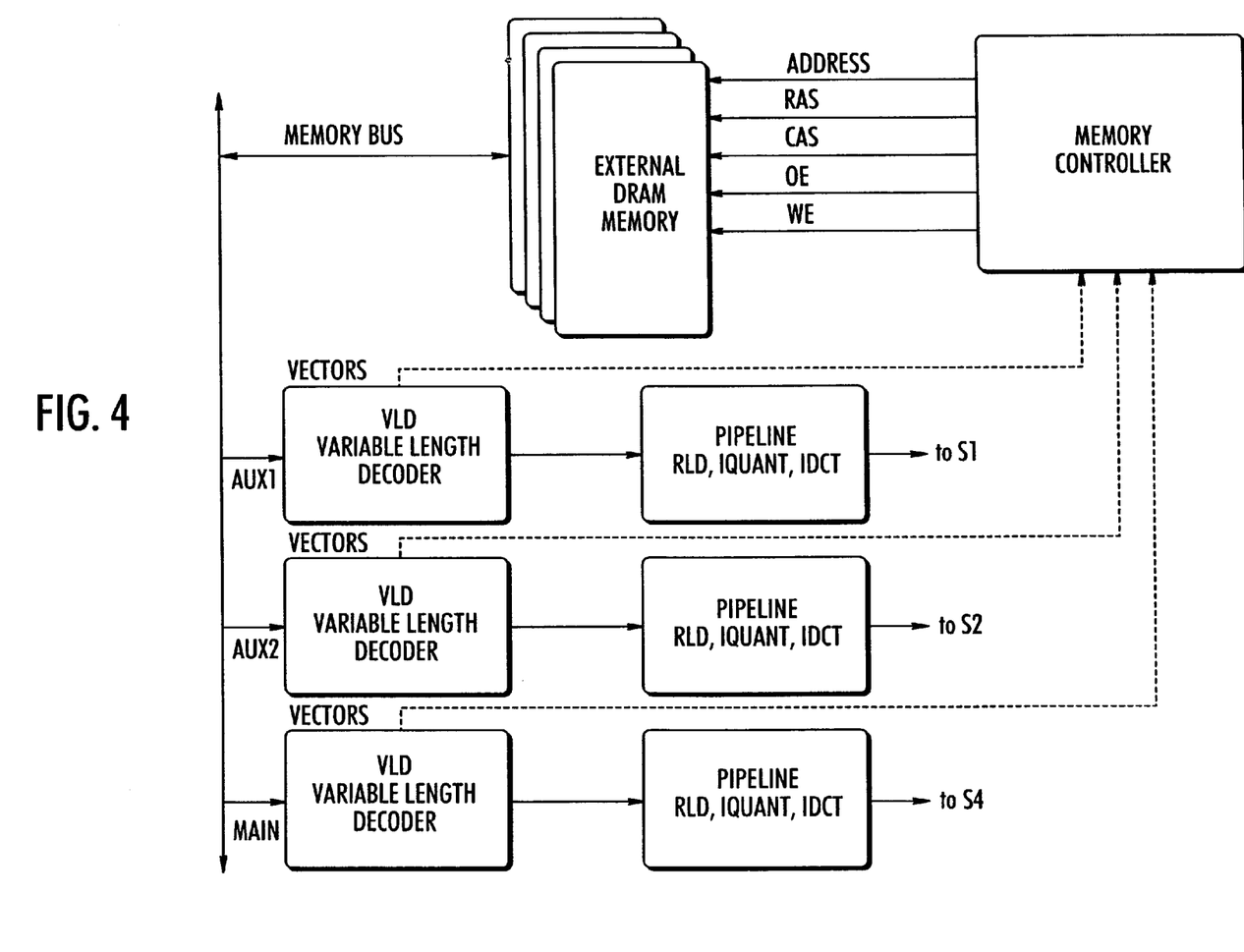
FIG. 4 is an explanatory diagram of the coordinated functioning of the three pipeline blocks, MAIN, AUX1 and AUX2 of the decoder "core" of FIG. 1.

For example, referring to the explanatory scheme of FIG. 4, when one of these macroblocks enters AUX1 the block I-VLC extracts the forward vector for the relative motion compensation. Such a vector permits to the RAM Controller, to read the relative forward predictor (higher or lower) and to store it in the 16*16*2 pel registers of the lower portion of the circuit diagram of the FORWARD PREDICTOR BUFFER of FIG. 2, which respectively feed S1 and S2. This process is the same for each of the 4 macroblocks that are fed to AUX1 and AUX2.

Figure 3:
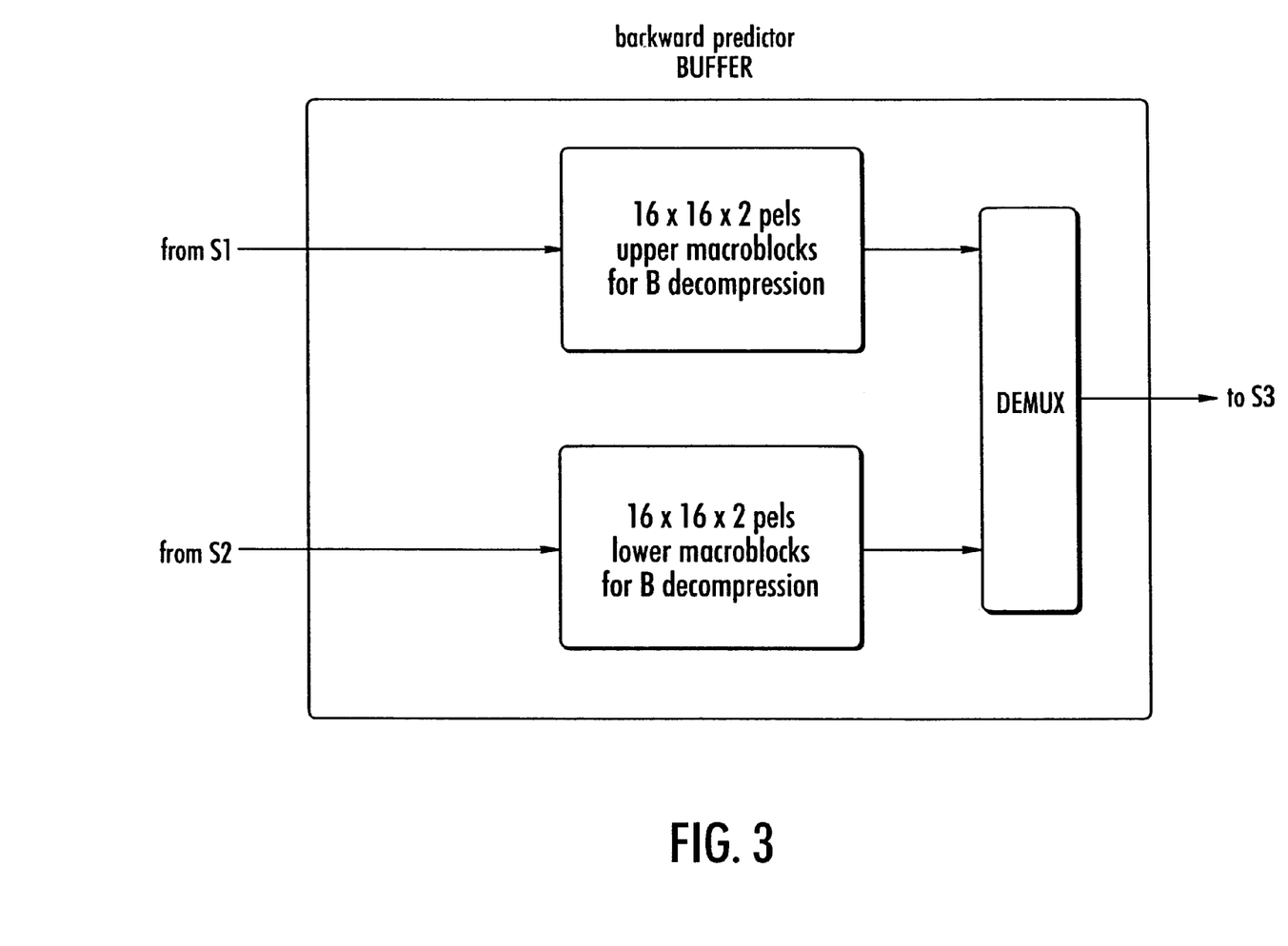
FIG. 3 shows the architecture of the BACKWARD PREDICTOR BUFFER block of the "core" of the decoder of FIG. 1.

The adders S1 and S2 complete the motion compensation of the decompressed macroblocks output from the pipelines AUX1 and AUX2, which subsequently are stored in the BACKWARD PREDICTOR BUFFER shown in FIG. 3. As illustrated in FIG. 3, the architecture of the BACKWARD PREDICTOR BUFFER of the decoder's "core", comprises a pair of 16*16*2 pel registers, for higher and lower macroblocks, respectively, of the P-picture, which define the backward predictor value of the B-macroblock undergoing decompression in the MAIN pipeline. A demultiplexer DEMUX is also included for selecting the backward predictor to be sent to the motion compensation adder S3, during the decompression process of the macroblocks of a B-picture.

The high-degree of parallelism of the architecture of the decoder "core" of the invention, characterized by the presence of three essentially identical decoding and decompressing pipelines, (MAIN, AUX1 and AUX2), their internal structure and the way in which these pipelines cooperate is highlighted in the scheme of FIG. 4. Each pipeline normally contains or is preceded by a variable length input decoder VLD, followed by a "Run Length Decoder", by a quantization block IQUANT and by a processor for the calculation of the inverse discrete cosine transform IDCT.

For better illustrating the algorithm on which the method of the invention is based, the functioning of the system of the invention is analyzed hereinbelow for different significant cases that may occur during the normal operation of an MPEG-2 decoder, including the most critical situations.

Case 1—B Frame (Frame Prediction)—P Frame

Figure 5:
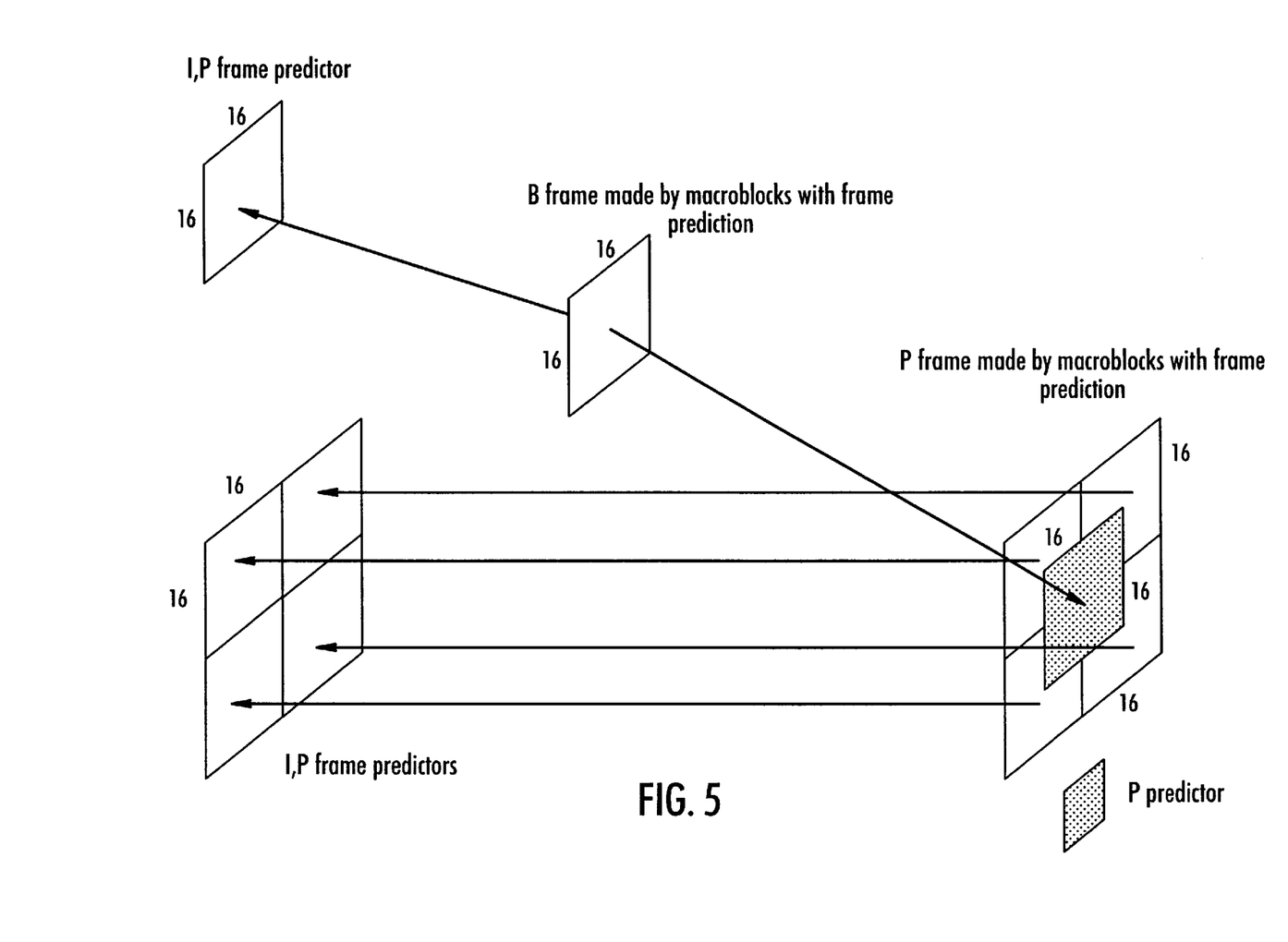
FIGS. 5 to 12 illustrates as many cases of reconstruction by the decoder of a macroblock of a B-picture.

A first case of the predictors arrangement is illustrated in FIG. 5. FIG. 5 shows the 16*16 pel B-macroblock to be decompressed and the relative predictors I and P. The motion estimation for the B-macroblock is of the so-called "frame" type.

The P predictor is not immediately accessible, while are so the four 16*16 pel macroblocks that define the area within which is enclosed the predictor. Each of the four macroblocks being of the P-type has associated therewith a predictor (16*16 pels) belonging to the forward predictor, which is necessary for its decompression. In this case each of these macroblocks is estimated with respect to the forward predictor according to the so-called "frame" mode. Once the decompression of the four P-macroblocks is completed, the frame type predictor for the B-macroblock may be extracted.

Figure 6:
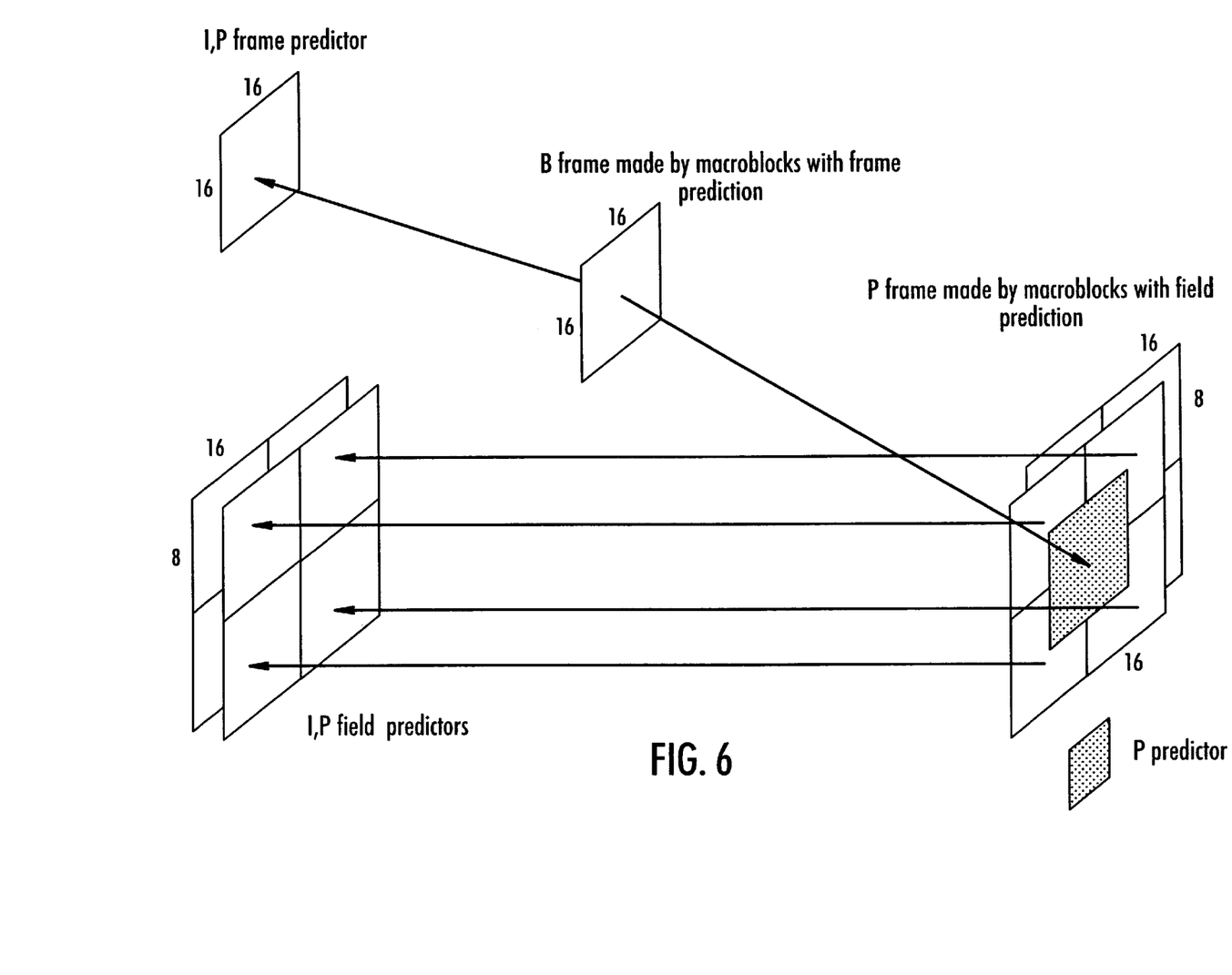

FIG. 6 shows the case in which the P-macroblocks, of the frame type, have associated thereto a motion estimation of the so-called "field" type.

Case 2—B Frame (Field Prediction)—2 P Fields

Figure 7:
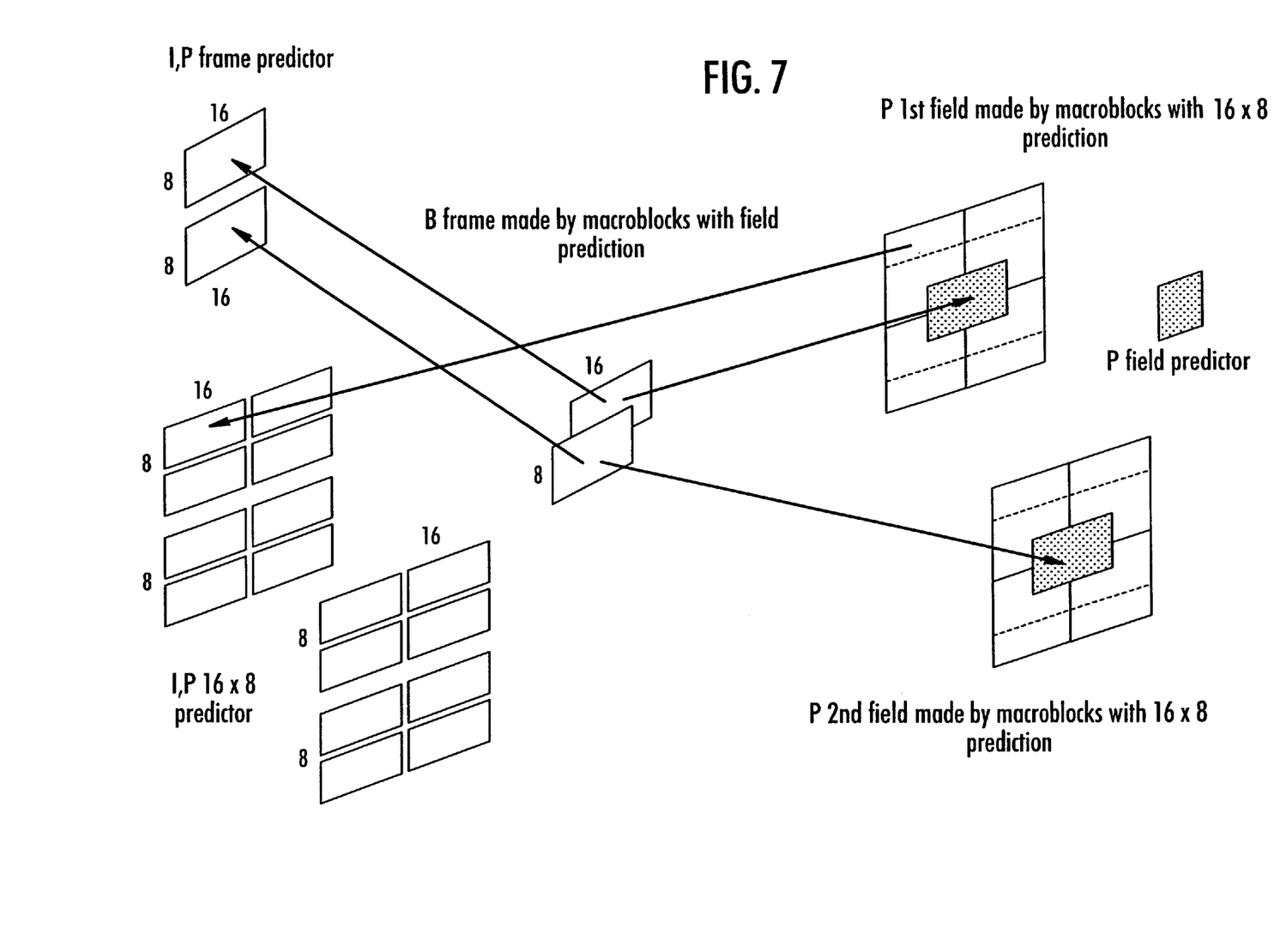

This is one of the most critical cases due to the large amount of data required, as shown in FIG. 7. This figure shows a B-macroblock, to be reconstructed belonging to a frame, which may be composed of two parts of the so-called "field" type; each of which points to a 16*8 predictor in one of the two P-fields.

The two P-fields are two compressed pictures independent from one another. Each predictor (16*8) is not directly accessible because it could be enclosed in a region defined by four P-macroblocks (16*16). A prediction of the 16*8 type could be defined for each of the four macroblocks, since they belong to a field. Therefore, in order to decompress each of them, it is necessary to access to two 16*8 blocks belonging to the forward predictor. This also applies to each of the four P-macroblocks. All this must be repeated for both the 16*8 field portions of the B-macroblock that must be decompressed.

Figure 8:
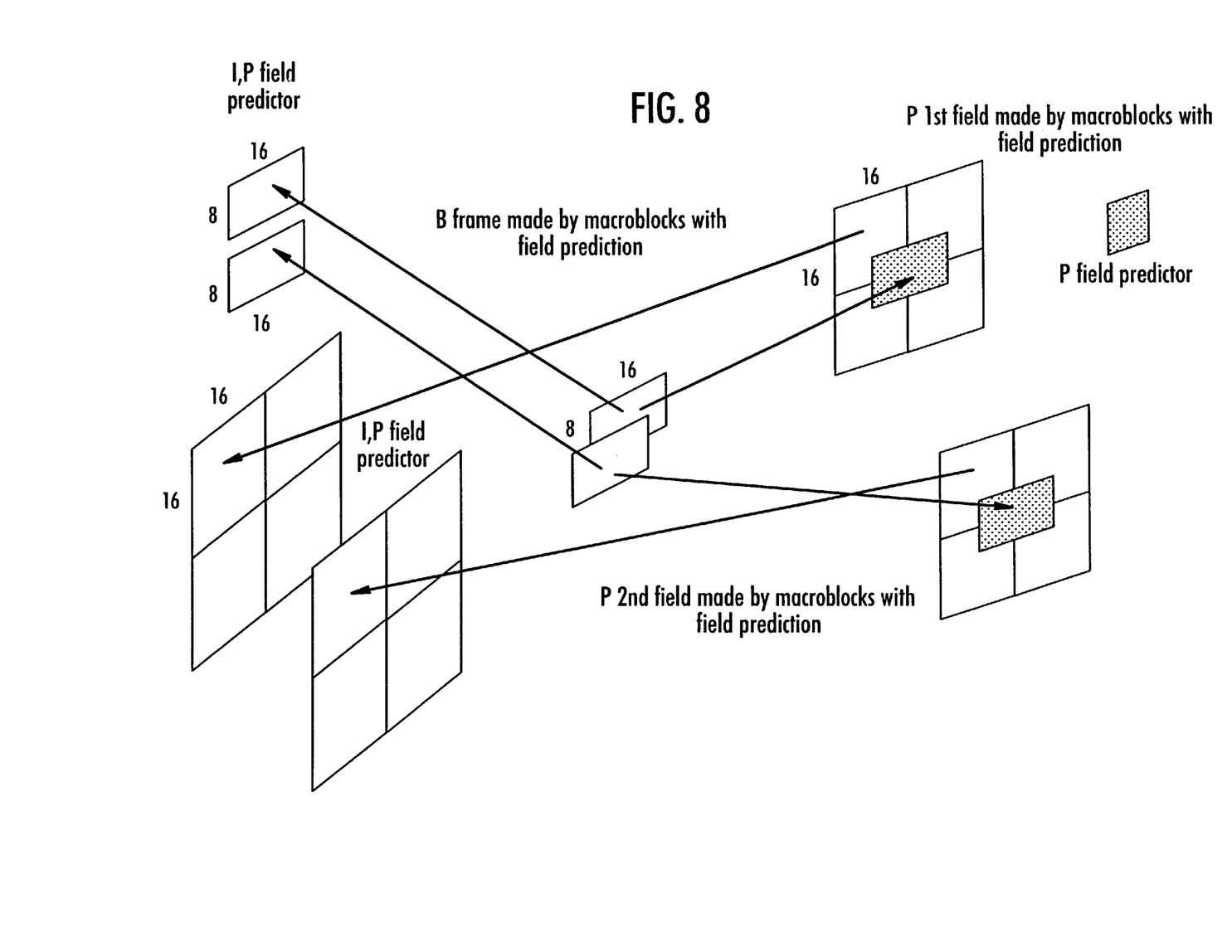
Figure 9:
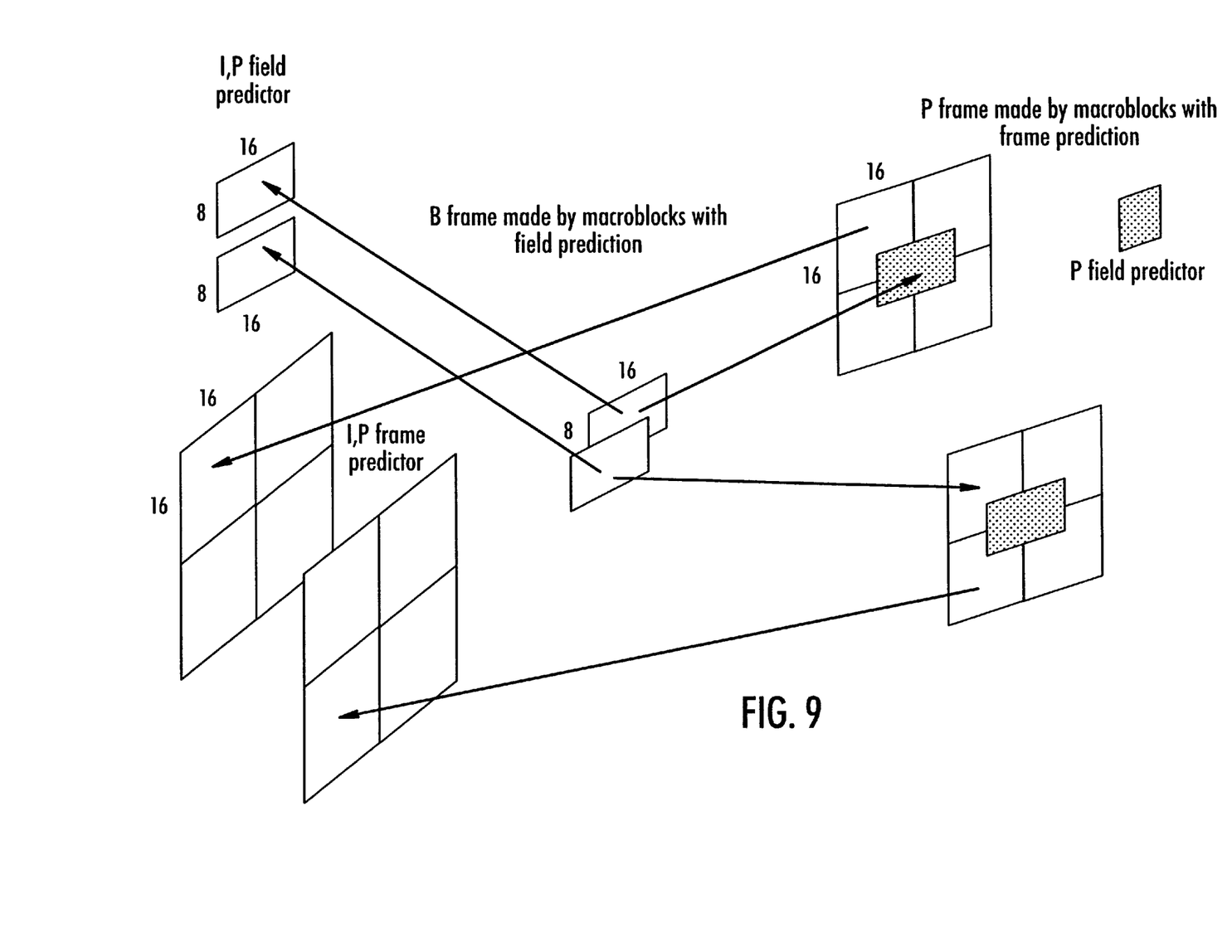
Figure 10:
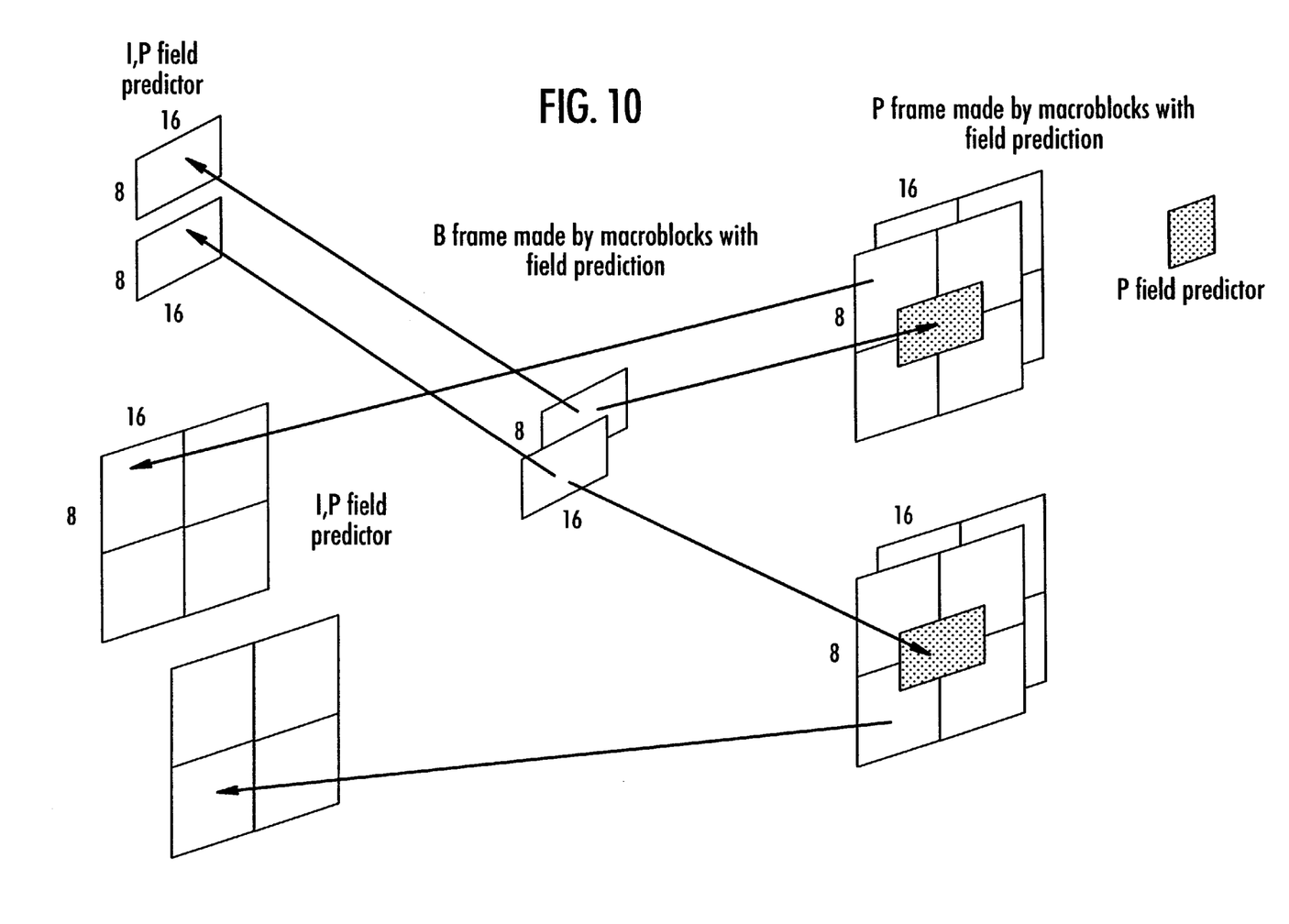

FIG. 8 shows a case similar to the preceding one, but wherein each P-macroblock has associated thereto a motion estimation of the field type. Instead, in the situation shown in FIG. 9, the B predictors are located on the same picture of a frame type. Therefore, the predictor of the P-macroblocks can be of the frame type (or otherwise of the field type, as depicted in FIG. 10).

Case 3—B Field (Field Prediction)—P Field

Figure 11:
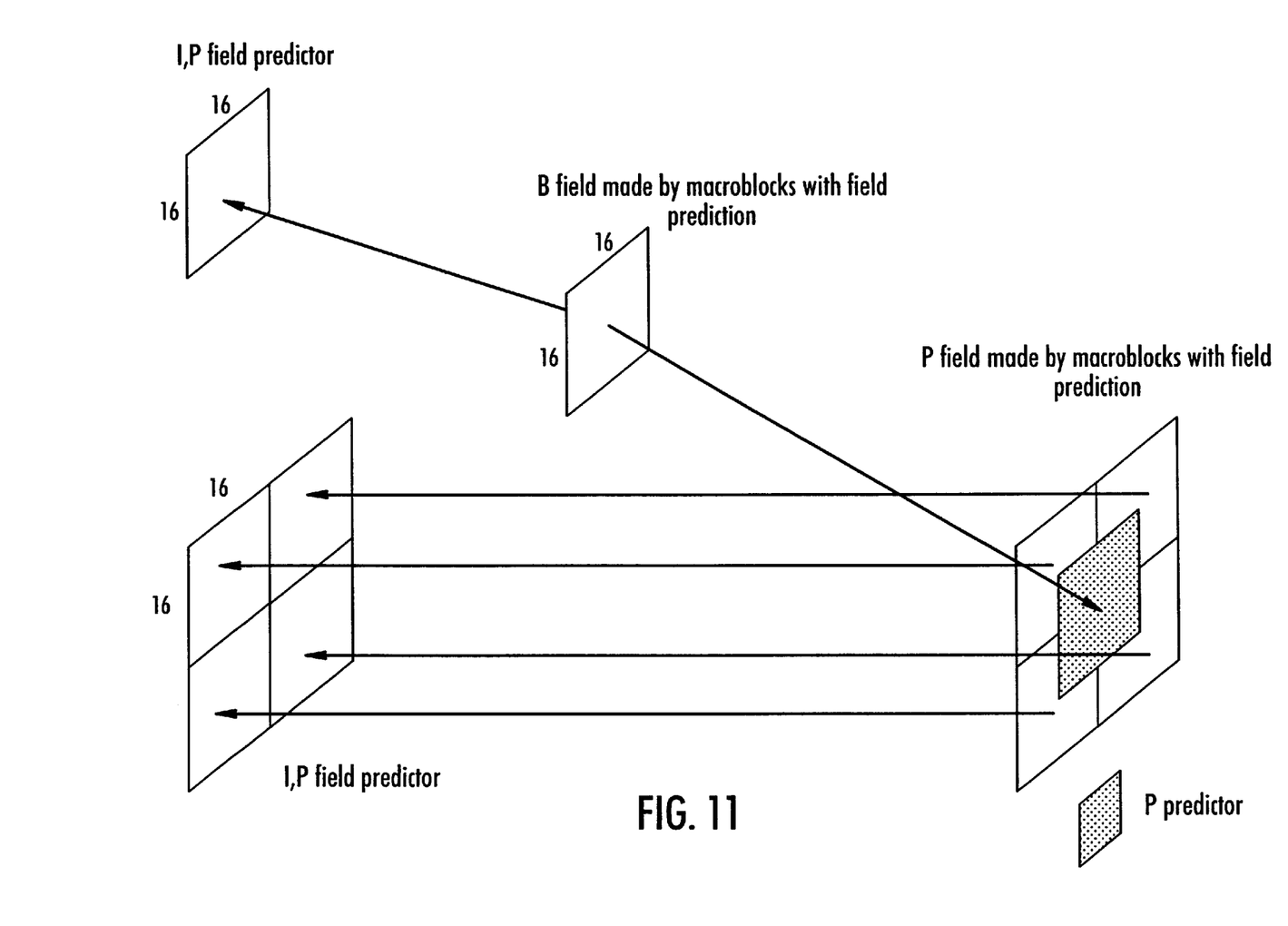

In the case shown in FIG. 11, the B-macroblock is of the (16*16) field type: Therefore the same considerations made for the case 1 apply to this case too. Moreover, the estimation of the P-macroblocks may, in this case, be even of the 16*8 type.

Case 4—B Field (16*8 Prediction)—P Field

Figure 12:
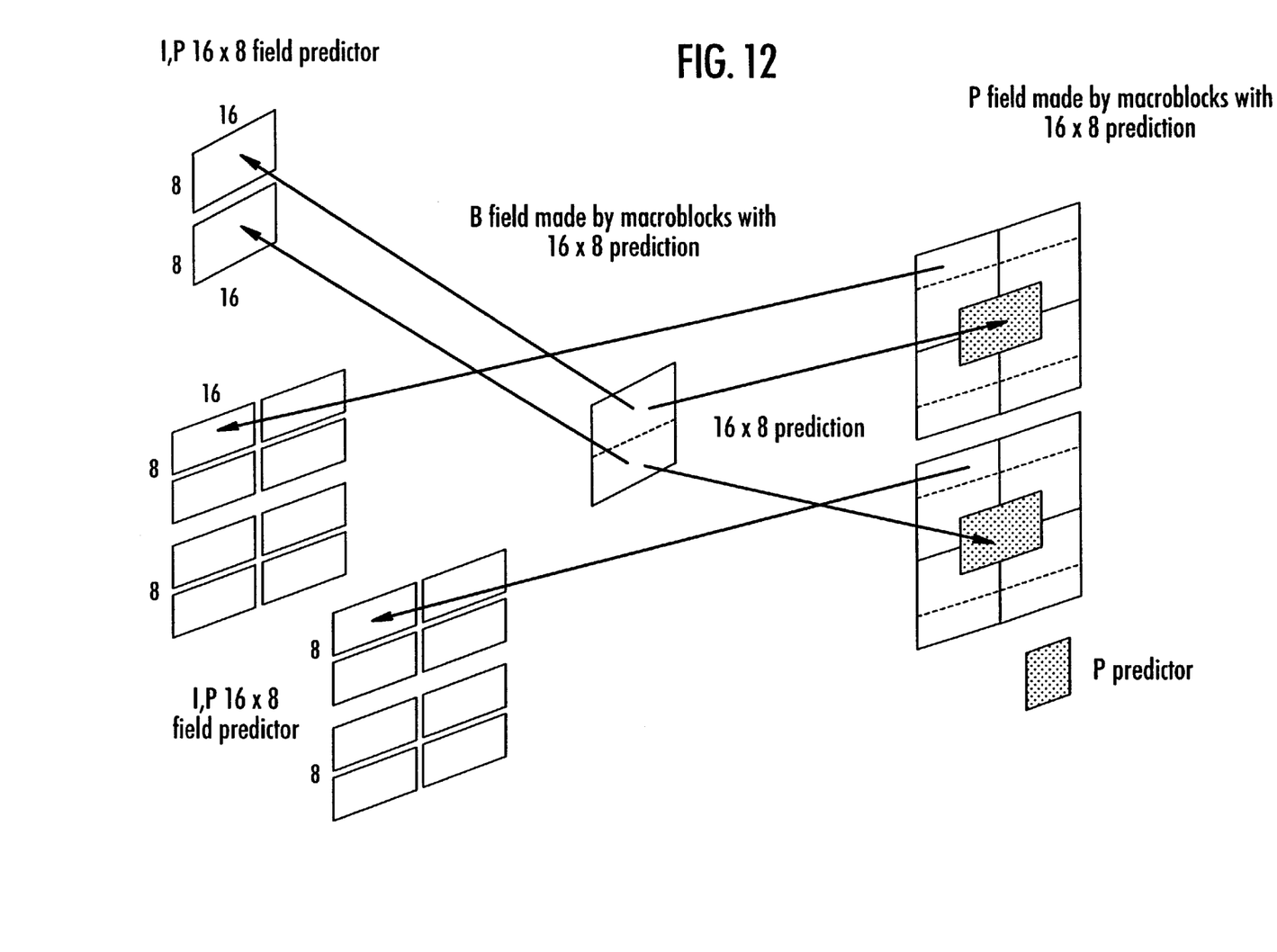

The case shown in FIG. 12 represents another critical case as that of case 2. The difference from case 2 is that the B-macroblock is of the field type (16*16 pels) and, therefore, the prediction could be of the 16*8 type. The macroblock can be divided into two parts of 16*8, that is a lower one and a higher one. Each part of the 16*8 B-macroblock identifies the predictors, as described for the case 2 (FIG. 7).

I claim:

1. A method for optimizing a reduction of video memory requirement of an MPEG-2 decoder comprising a stage for decompressing respective I, P and B-pictures, the method comprising the steps of:

storing data relative to the I, P and B-pictures in respective buffers organized in the video memory and wherein decompression of said B-picture requires using forward and backward motion compensation predictors respectively;

decompressing macroblocks of said B-picture while maintaining respective backward predictor values, stored in the video memory, in a compressed form;

decompressing macroblocks of a compressed P-picture using respective forward predictor values;

defining using macroblocks of the decompressed P-picture a region of stored compressed backward predictor values containing the backward predictor value of the B-picture macroblock undergoing decompression;

extracting from the region respective backward predictor value for said B-picture macroblock undergoing decompression; and completing a motion compensation routine according to the MPEG-2 standard.

2. An MPEG-2 video decoder for interfacing with a control bus and a data bus relative to video picture processing to be written on and read from respective storage buffers organized in an external video RAM, said decoder comprising:

a core comprising a first-in-first-out buffer for acquiring and writing compressed data to and from a first buffer organized in said external video RAM, a picture start code detector circuit, a main decoding and decompression pipeline functioning at a clock frequency f, and a buffer for storing a decompressed forward predictor;

second and third auxiliary decoding and decompression pipelines operating in parallel to said main pipeline and at a double clock frequency (2 f);

first and second adders adding decoders and decompressed data read from said external video RAM to decoded and decompressed data output by said second and third decoding and decompression pipelines, respectively, and outputting decompressed data that define a backward predictor value relative to a B-picture macroblock undergoing decompression;

a buffer capable of storing said backward predictor value pertaining to said B-picture macroblock undergoing decompression;

a third adder defining motion vectors, capable of adding forward predictor data and backward predictor data read from respective buffers;

a multiplexer selecting said motion vectors;

a fourth adder for motion compensation by adding decoded and decompressed data of each B-picture macroblock output by said main pipeline of decoding and decompression to a corresponding motion vector selected by said multiplexer;

means for storing decoded, decompressed and motion compensated data in said forward predictor buffer of said external video RAM; and macroblock to raster scan converter means and post-processing means for converting said decoded, decompressed data and sending the converted data to a video encoder for display on a TV screen.

* * * * *